US 011649903B2

(12) United States Patent
Jelken et al.

(10) Patent No.: US 11,649,903 B2
(45) Date of Patent: May 16, 2023

(54) MODULAR VALVE ASSEMBLY

(71) Applicant: Fisher Controls International LLC, Marshalltown, IA (US)

(72) Inventors: Shannon Eugene Jelken, Marshalltown, IA (US); Katherine Nicole Bartels, Marshalltown, IA (US); Thomas Nelson Gabriel, Marshalltown, IA (US); Lawrence Martin, Marshalltown, IA (US); Julian Adin Mann, III, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/360,265

(22) Filed: Jun. 28, 2021

(65) Prior Publication Data
US 2022/0412471 A1  Dec. 29, 2022

(51) Int. Cl.
*F16K 27/04* (2006.01)
*F16K 11/07* (2006.01)

(52) U.S. Cl.
CPC ........ *F16K 11/0716* (2013.01); *F16K 27/041* (2013.01)

(58) Field of Classification Search
CPC .......... F16K 27/04; F16K 27/041; F16K 3/24; F16K 3/246; F16K 47/08; F16K 11/0716; Y10T 137/87265; Y10T 137/87539; Y10T 137/86791
See application file for complete search history.

(56) References Cited

U.S. PATENT DOCUMENTS

| 2,507,851 | A  | * | 5/1950 | Bryant | ...................... | F16K 1/06 |
|---|---|---|---|---|---|---|
|  |  |  |  |  |  | 251/142 |
| 7,159,617 | B2 | * | 1/2007 | Erickson | ............... | F16K 39/022 |
|  |  |  |  |  |  | 251/282 |
| 9,410,630 | B1 | * | 8/2016 | Taylor | ................... | F16K 17/406 |
| 2006/0219972 | A1 | * | 10/2006 | Eernisse | ............... | F16K 27/041 |
|  |  |  |  |  |  | 251/324 |
| 2015/0013790 | A1 | * | 1/2015 | Hoff | ........................ | F16K 27/02 |
|  |  |  |  |  |  | 137/553 |
| 2016/0201838 | A1 | * | 7/2016 | Flanders | ................. | F16L 55/07 |
|  |  |  |  |  |  | 137/12 |
| 2017/0211481 | A1 | * | 7/2017 | Denton | ..................... | F16K 1/12 |

* cited by examiner

*Primary Examiner* — Michael R Reid
(74) *Attorney, Agent, or Firm* — Quarles & Brady LLP

(57) ABSTRACT

A modular valve assembly can include a core spool module and a plurality of end connection modules. The end connection modules can be configured to be secured to the core spool module at one or more of a core inlet or a core outlet of the core spool module to provide one or more respective, different flow configurations for the modular valve assembly. The core spool module can include a bonnet portion that is integrally formed with the core inlet and the core outlet and a seat ring configured to provide a seal against flow of process fluid through the modular valve assembly.

7 Claims, 7 Drawing Sheets

MODULAR VALVE ASSEMBLY

BACKGROUND

Flow control devices, such as a variety of valve assemblies, can be used in various industrial, commercial, and other settings including to regulate flowrate or pressure for a fluid flowing from a fluid source. In some applications, it may be useful to selectively assemble components of a valve assembly to direct flow through a main valve body in a particular direction relative to the main valve body or to adjust the volume taken up by the valve assembly to accommodate particular space requirements, for example.

SUMMARY

Some embodiments of the invention provide a modular valve assembly. The modular valve assembly can include a core spool module that defines an external body portion of the modular valve assembly and an internal flow passage for flow of process fluid through an interior of the modular valve assembly. The core spool module can include a core inlet, a core outlet, a stem opening for passage of a valve stem into the interior of the core spool module, and an external mounting surface for an actuator configured to move the valve stem. A plurality of end connection modules can be configured to be selectively secured to the core spool module at one or more of the core inlet or the core outlet to provide one or more respective, different flow configurations for the modular valve assembly.

In some embodiments, a modular valve assembly can include a seat ring configured to provide a seal against flow of process fluid through the modular valve assembly. At a core inlet of a core spool module, a seam between the core spool module and an attached end connection module can be aligned in a radial direction with the seat ring.

In some embodiments, a modular valve assembly can include a seat ring integrally formed with one or more of a flow cage or a plug guide.

In some embodiments, a modular valve assembly can include a seat ring integrally formed with a sealing ring that is secured at a seam to provide a seal between a core spool module and an attached end connection module at a core inlet.

In some embodiments, a modular valve assembly can include a plug configured to be moved over a range of travel by an actuator to selectively restrict flow through the modular valve assembly. A core inlet can be disposed upstream of a valve stem and upstream of the range of travel of the plug.

In some embodiments, a modular valve assembly can include a stem opening that is configured to receive packing to seal the stem opening against venting of a process fluid.

In some embodiments, a modular valve assembly can include one or more end connection modules. The one or more end connection modules can be configured to be secured to a core spool module at one or more of a core inlet or a core outlet with the one or more of the end connection modules at any of a respective plurality of rotational orientations within a continuous annular range. In some embodiments, the continuous annular range can extend between 0 degrees and 360 degrees, inclusive.

In some embodiments, a modular valve assembly can include a clamp ring and a sealing ring. The clamp ring can be configured to clamp exterior to a core spool module and an end connection module at a core inlet or a core outlet, to secure the sealing ring interior the core spool module and the end connection module, to provide a seal between the core spool module and the end connection module.

In some embodiments, a modular valve assembly can include an external mounting surface that is substantially planar.

Some embodiments of the invention provide a modular valve assembly. The modular valve assembly can include a core spool module that defines a core external body portion and a core internal flow passage for flow of process fluid through an interior of the core spool module. The core spool module can include a bonnet portion, and a core inlet and a core outlet that are integrally formed with the bonnet portion. The internal flow passage can extend from the core inlet to the core outlet. A first end connection module can have a first connection inlet and a first connection outlet and can define a first external body portion and a first internal flow passage for flow of the process fluid. A second end connection module can have a second connection inlet and a second connection outlet and can define a second external body portion and a second internal flow passage for flow of the process fluid. The first and second end connection modules can be configured to be secured to the core spool module, to provide a combined internal flow passage for the process fluid that includes the internal core flow passage and the first and second internal flow passages, with: the first connection outlet secured at the core inlet; the second connection inlet secured at the core outlet; the first connection inlet providing a main valve inlet for the modular valve assembly; and the second connection outlet providing a main valve outlet for the modular valve assembly.

In some embodiments, a modular valve assembly can include a first end connection module having a first connection outlet that is configured to be selectively secured to a core inlet at any of a plurality of first rotational orientations within a first continuous angular range and a second end connection module having a second connection inlet that is configured to be selectively secured to a core outlet at any of a plurality of second rotational orientations within a second continuous angular range, to provide a plurality of corresponding flow configurations for the modular valve assembly.

In some embodiments, a modular valve assembly can include a bonnet portion that is open to a core internal flow passage.

In some embodiments, a modular valve assembly can include a core spool module that includes a stem opening for passage of a valve stem into an interior of the core spool module, and a planar external mounting surface configured to secure an actuator for the valve stem.

In some embodiments, a modular valve assembly can include a ring insert configured to be secured at a seam between a first connection outlet and a core inlet to provide one or more of: a seal between the first connection outlet and the core inlet; or a seat for a plug of the modular valve assembly.

In some embodiments, a modular valve assembly can include a ring insert configured as an integrally formed insert that includes a sealing portion to provide a seal between a first connection outlet and a core inlet, and a seat portion to provide a seat for a plug of the modular valve assembly.

In some embodiments, a modular valve assembly can include a third end connection module having a third connection inlet and a third connection outlet and defining a third external body portion and a third internal flow passage for flow of a process fluid. A fourth end connection module can have a fourth connection inlet and a fourth connection outlet and can define a fourth external body portion and a fourth internal flow passage for flow of the process fluid. The third and fourth end connection modules can be configured to be selectively secured to a core spool module at the core inlet and the core outlet, to provide a different flow configuration for the modular valve assembly than when a first and second end connection modules are secured to the core spool module.

In some embodiments, a modular valve assembly can include a first core spool module and a second core spool module. The second core spool module can define a second core external body portion and a second core internal flow passage for flow of process fluid. The second core spool module can include a second bonnet portion, and a second core inlet and a second core outlet that are integrally formed with the second bonnet portion. The second core internal flow passage can extend from the second core inlet to the second core outlet. The second core spool module can be configured to be secured to one or more of the first core spool module, a first end connection module, or a second end connection module, to provide a three-way valve configuration.

In some embodiments, a modular valve assembly can include a first connection outlet configured to be secured at a second core inlet and a second core outlet that is configured to be secured at a core inlet of a first core spool module to provide a three-way valve configuration.

Some embodiments of the invention provide a method of configuring a modular valve assembly. The method can include forming a core valve module that includes a core inlet, a core outlet, and a bonnet portion integrally formed with the core inlet and the core outlet so that a core internal flow passage extends from the core inlet to the core outlet via the bonnet portion. The method can also include forming a plurality of end connection modules, each having a connection inlet, a connection outlet, and a connection internal flow passage that extends from the connection inlet to the connection outlet, each of the end connection modules defining a different respective connection flow configuration, via the connection inlet, the connection outlet, and the connection internal flow passage, and being configured to be selectively secured to the core valve module at one or more of the core inlet or the core outlet to define, in combination with the core valve module, a respective valve configuration with a combined internal flow passage that includes the connection internal flow passage and the core internal flow passage. The method can include selectively securing a first of the end connection modules with one of the connection inlet or the connection outlet to selectively provide a corresponding first of the valve configurations.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
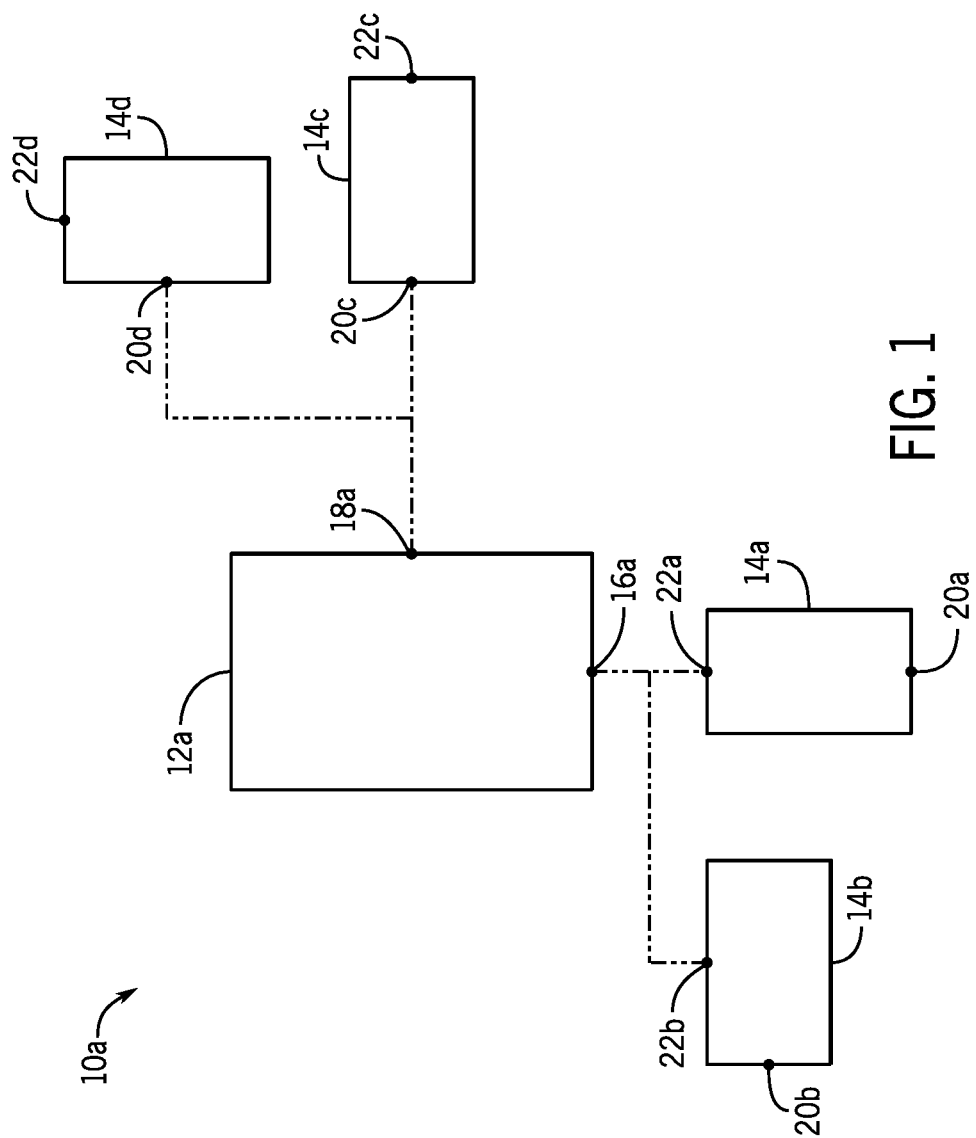
FIG. 1 is a schematic illustration of a modular valve assembly according to an embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, flow control devices can be used to control flowrate or pressure for a process fluid flowing from a fluid source toward a downstream application. A flow control device, for example, can be configured as a valve (or other) assembly having a main valve inlet and a main valve outlet. A main flow passage can extend between the main valve inlet and the main valve outlet and through a main valve body. The main valve body can typically include a flow control assembly, such as a plug or a disc, for example, to restrict flow through the valve assembly.

In some conventional valve assemblies, a main valve body can be secured to a separate valve bonnet during an assembly process of the valve assembly. In general, a valve bonnet can provide a stem opening to receive a valve stem and a mount location to secure an actuator to actuate the valve stem. In some cases, a valve bonnet can also enclose particularly devices (e.g., main springs of pressure-relief valves). In such conventional valve assemblies, in which the valve bonnet is separate from the main valve body, it can be costly and labor intensive to separately manufacture the valve bonnet and the main valve body, and to secure the valve bonnet to the main valve body. In some conventional valve assemblies, the valve bonnet can be secured to the valve body, via numerous studs or other fasteners, for example, at a bonnet joint. In general, in this regard, the presence of a bonnet joint can create an additional potential failure mode of the valve assembly (i.e., potential leakage at the bonnet joint) that may require components that form the bonnet joint to be checked, serviced, or replaced over the lifetime of the valve assembly.

Embodiments of the invention can address these issues, including by providing valve bodies with integrated bonnet portions (i.e., without separately attached bonnets). For example, some embodiments provide a main valve body configured as a core spool module that includes a bonnet portion. The core spool module can include a core inlet and a core outlet that are integrally formed with the bonnet portion, with a main flow passage extending through the core spool module between the core inlet and outlet. In some embodiments, a bonnet portion can include a stem opening for passage of a valve stem into an interior of the core spool module. Similarly, the bonnet portion can provide an external mounting surface for an actuator configured to move the valve stem. In some embodiments, the external mounting surface can form a substantially planar surface (e.g., planar in accordance with expected tolerances associated with a particular method of manufacturing).

In addition to supporting an actuator, the external mounting surface can provide generally more mounting space (e.g., a planar mount area) compared to conventional valve bonnets. For example, the external mounting surface can provide a surface adjacent to a valve stem to integrate, mount, or otherwise house a variety of sensors. Such sensors can include one or more of a vibration sensor (e.g., an acoustic emission sensor), an infrared sensor, or a gas spectrometer, for example. Additionally, the external mounting surface can allow data acquisition devices and/or transmitters to be easily and efficiently mounted to the core spool module.

In general, by integrating a bonnet portion with a main valve body according to embodiments of the invention, a main housing, packing box bore (e.g., a valve stem opening), a yoke boss (e.g., an external mounting surface), and other related components (as applicable) can be formed as a single piece via a variety of manufacturing methods, such as casting, for example. This can, for example, reduce part count and decrease material and manufacturing costs while increasing flexibility regarding to different installations and customer needs. Additionally, integrating the bonnet portion with the main valve body to form a core spool module can eliminate a bonnet joint, and thus, a potential failure mode of the entire valve assembly.

Embodiments of the invention can also provide a modular valve assembly, as can allow for substantial flexibility in designing a particular valve assembly for a particular purpose (or purposes). In this regard, for example, a modular valve assembly can generally include a core spool module and a plurality of end connection modules. The end connection modules can be configured to be secured to the core spool module at one or more of an inlet to the core module or an outlet to the core module to provide a variety of different flow configurations for the modular valve assembly. Thus, in general, a modular valve assembly can allow for a standardized core module to be secured to a variety of end connection modules to provide substantially customizable overall valve characteristics. For example, use of a modular valve assembly can provide an opportunity to select one or more of a variety of end connection modules that can customize characteristics such as cavitation protection, effective orifice sizes, flow straightening capabilities, outlet areas, joint angles, etc., while relying on a single, adaptable core-module design.

Generally, any number of core spool modules and end connection modules can be secured together to provide a customized configuration for a valve assembly. In some embodiments, a modular valve assembly can include a first core spool module and a second core spool module, each including a core inlet and a core outlet. The first core spool module can be configured to be secured to the second core module to provide a three-way valve configuration or other multi-core assembly. For example, the core outlet of the second core spool module can be secured to the core inlet of the first core spool module so that flow exiting the second core spool module enters the first core spool module. Accordingly, a plurality of end connection modules can be connected to one or more of the first and second core spool modules to provide a customizable flow configuration through the modular valve assembly. In particular, for example, an outlet of a first end connection module can be secured to the inlet of the second core spool module and an inlet of a second end connection module can be secured to the outlet of the first core spool module to form a complete valve assembly passage.

Embodiments of the invention can also provide a modular valve assembly having an improved configuration for a seat ring. Generally, a seat ring can be configured to provide a seal against flow of a process fluid through a modular valve assembly. For example, a seat ring can be disposed adjacent to a core inlet of a core spool module so that at the core inlet, a seam between the core spool module and an attached end connection module is aligned in a radial direction with the seat ring (e.g., so that the seat ring is secured at and extending fully along the seam). In some embodiments, a seat ring can be integrally formed with a flow cage or a plug guide that is configured to guide a plug of a modular valve assembly. Additionally or alternatively, a seat ring can be integrally formed with a sealing ring that is secured at the seam to provide a seal between a core spool module and an attached end connection module at the core inlet.

In some embodiments, a modular configuration can allow for rotatable (e.g., infinite rotatable) adjustment of the rotational orientation of one module relative to another module. In this regard, in some embodiments, an end connection module can be secured to a core spool module via a clamp ring. For example, a clamp ring can be configured to clamp an exterior flange of each of an end connection module and a core spool module at one or more of a core inlet or a core outlet. At the core inlet, for example, the clamp can secure a sealing ring between an end connection module and the core spool module to provide a seal between the end connection module and the core spool module. In some embodiments, a bolted joint or other joint connection mechanisms can secure a sealing ring between an end connection module and the core spool module at the core inlet.

As briefly described above, embodiments of the invention can provide a modular valve assembly that includes at least one core spool module and one or more end connection modules that are configured to be secured to the core spool module in a variety of combinations to provide a corresponding variety of flow configurations. The variety of flow configurations can correspond to a variety of customizable valve assembly characteristics, both internally through a flow passage within the valve assembly, and outside the body of the valve assembly. For example, securing various end connection modules to one or more core spool modules can adjust the exterior geometry of the valve assembly to accommodate space requirements or other constraints.

Referring now to FIG. 1, an example of a modular valve assembly 10a is illustrated. The modular valve assembly 10a includes a core spool module 12a and a plurality of end connection modules 14a-d. In the schematic illustration of FIG. 1, the core spool module 12a includes a core inlet 16a and a core outlet 18a. Each of the end connection modules 14a-d includes a respective connection inlet 20a-d and a respective connection outlet 22a-d. Generally, a core spool module (e.g., the module 12a) can include flow control devices (e.g., plugs and valve seats that can cooperate to selectively block or permit flow) as well as mounting features to secure actuators, sensors, or other equipment, whereas end connection modules (e.g., the modules 14a-d) can be configured to provide particular inlet or outlet flow patterns relative to an associated core spool module. In this regard, for example, a core spool module may generally not include a separate bonnet (as also discussed below).

In general, the core spool module 12a can be selectively combined with any one or more of the end connection modules 14a-d in order to provide a customized flow and flow-control configuration for a particular application. In this regard, for example, any of the end connection modules 14a-d are configured to be selectively secured to the core spool module 12a at any select one of the core inlet 16a or the core outlet 18a, although only certain potential connections are expressly shown via dotted lines in FIG. 1. While FIG. 1 illustrates four end connection modules 14a-d, it should be appreciated that a larger number of end connection modules can be configured to be secured to the core spool module 12a.

In the illustrated embodiment, the first connection outlet 22a or the second connection outlet 22b is configured to be secured to the core spool module 12a at the core inlet 16a. Likewise, the third connection inlet 20c or the fourth connection inlet 20d is configured to be secured to the core spool module 12a at the core outlet 18a. Accordingly, other combinations of connection inlets 20a-d and connection outlets 22a-d can be secured to the core outlet 18a and the core inlet 16a, respectively, to provide additional flow configurations not necessarily shown in FIG. 1.

By way of example, when the first connection outlet 22a is secured to the core inlet 16a, and the third connection inlet 20c is secured to the core outlet 18a, the first connection inlet 20a is configured as a main valve inlet and the third connection outlet 22c is configured as a main valve outlet. Accordingly, a flow path through the finished valve assembly can extend from the first connection inlet 20a through the end connection module 14a to the core inlet 16a, through the core spool module 12a to the core outlet 18a and the third connection inlet 20c, then through the end connection module 14c to the connection outlet 22c and thereafter to other distinct downstream conduits or devices (not shown). However, a variety of other flow paths are possible, including via substitution or addition of other illustrated modules. Additional example configurations and details of modular valve assemblies including a single core spool module will be described in greater detail below with reference to FIGS. 4-6.

Figure 2:
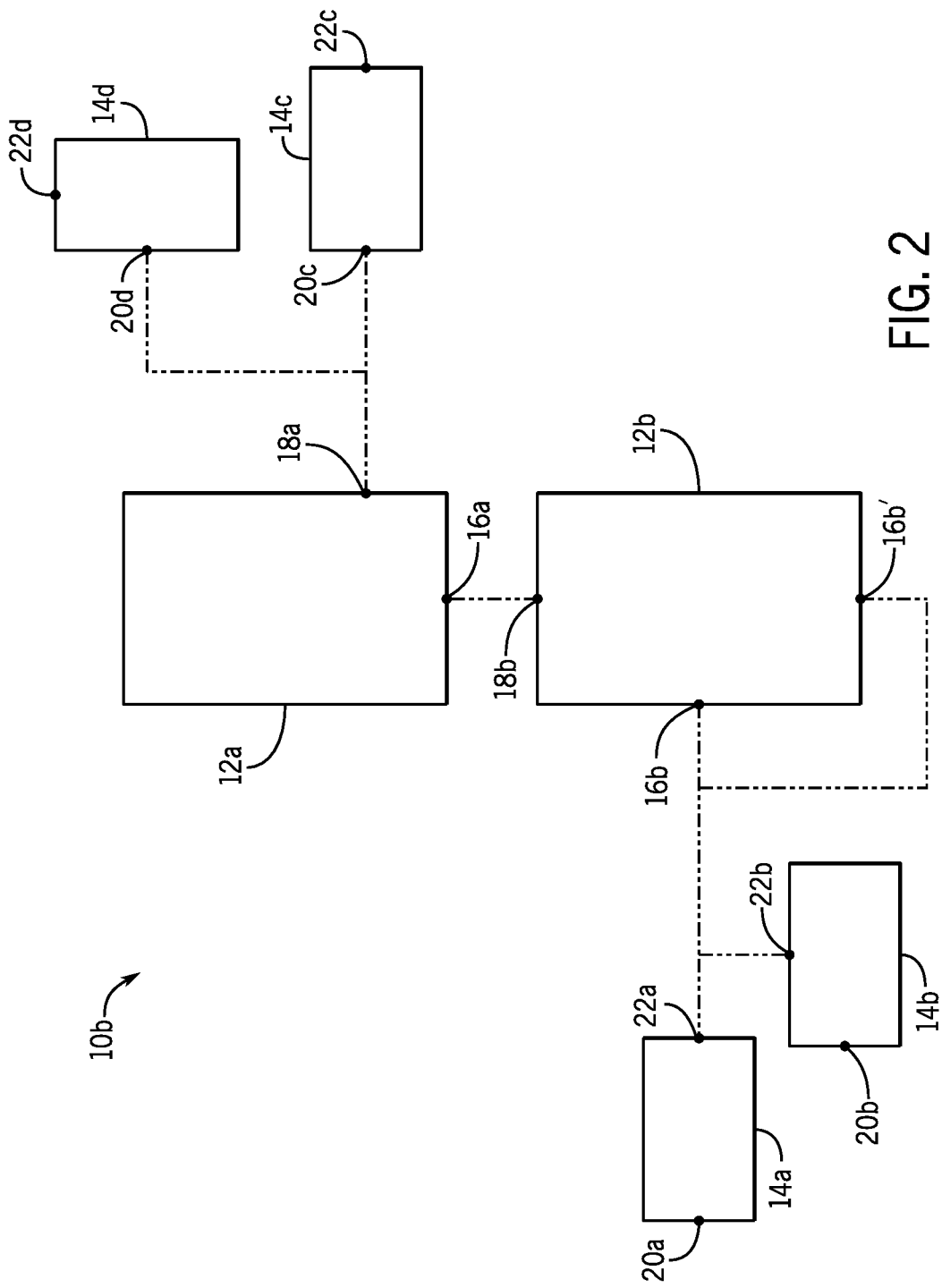
FIG. 2 is a schematic illustration of another modular valve assembly according to an embodiment of the invention.

Referring now to FIG. 2, another example of a modular valve assembly 10b is illustrated. The modular valve assembly 10b includes the core spool module 12a, which is configured as a first core spool module, and a second core spool module 12b. Similar to the modular valve assembly 10a, the modular valve assembly 10b can include the plurality of end connection modules 14a-d. Like the first core spool module 12a, the second core spool module 12b includes a second core inlet 16b and a second core outlet 18b. In general, the second core spool module 12b is configured to be secured to one or more of the first core spool module 12a, the first end connection module 14a, or the second end connection module 14b (or the third end connection module 14c or the fourth end connection module 14d, though not illustrated in FIG. 2), as can provide a three-way valve configuration in some arrangements.

Generally, an inlet or outlet of an end connection module can be configured to be secured to any of one or more outlets or inlets of a core spool module (or other module) to provide a customizable overall flow configuration. For example, in the illustrated embodiment, the first connection outlet 22a or the second connection outlet 22b is configured to be secured to the second core spool module 12b at the second core inlet 16b. Additionally, the third connection inlet 20c or the fourth connection inlet 20d is configured to be secured to the first core spool module 12a at the first core outlet 18a. Accordingly, other combinations of connection inlets 20a-d and connection outlets 22a-d can be secured to core inlets 16a, 16b and core outlets 18a, 18b to provide additional flow configurations not necessarily shown in FIG. 2.

By way of example, when the first connection outlet 22a is secured to the second core inlet 16b, the second core outlet 18b is secured to the first core inlet 16a, and the first core outlet 18a is secured to the third connection inlet 20c, the first connection inlet 20a is configured as a main valve inlet and the third connection outlet 22c is configured as a main valve outlet. Accordingly, a flow path through the finished valve assembly can extend from the first connection inlet 20a through the end connection module 14a to the core inlet 16b, through the core spool module 12b to the core outlet 18b and the core inlet 16a, through the core spool module 12a to the core outlet 18a and the third connection inlet 20c, then through the end connection module 14c to the connection outlet 22c and thereafter to other distinct downstream conduits or devices (not shown). However, a variety of other flow paths are possible, including via substitution or addition of other illustrated modules. Further, in some embodiments, a core (or other) module can include multiple inlets or multiple outlets. For example, the core spool module 12b is illustrated with a third inlet (or outlet) 16b' that can be configured for connection with either of the modules 14a, 14b or for other operational configurations (e.g., direct connection to an inlet or outlet pipe). An example configuration of a modular valve assembly including first and second core spool modules will be described in greater detail below with reference to FIG. 7.

In some implementations, devices or systems (e.g., a valve assembly or components of a valve assembly) disclosed herein can be utilized, manufactured, or installed using methods embodying aspects of the invention. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the invention, of the utilized features and implemented capabilities of such device or system.

Figure 3:
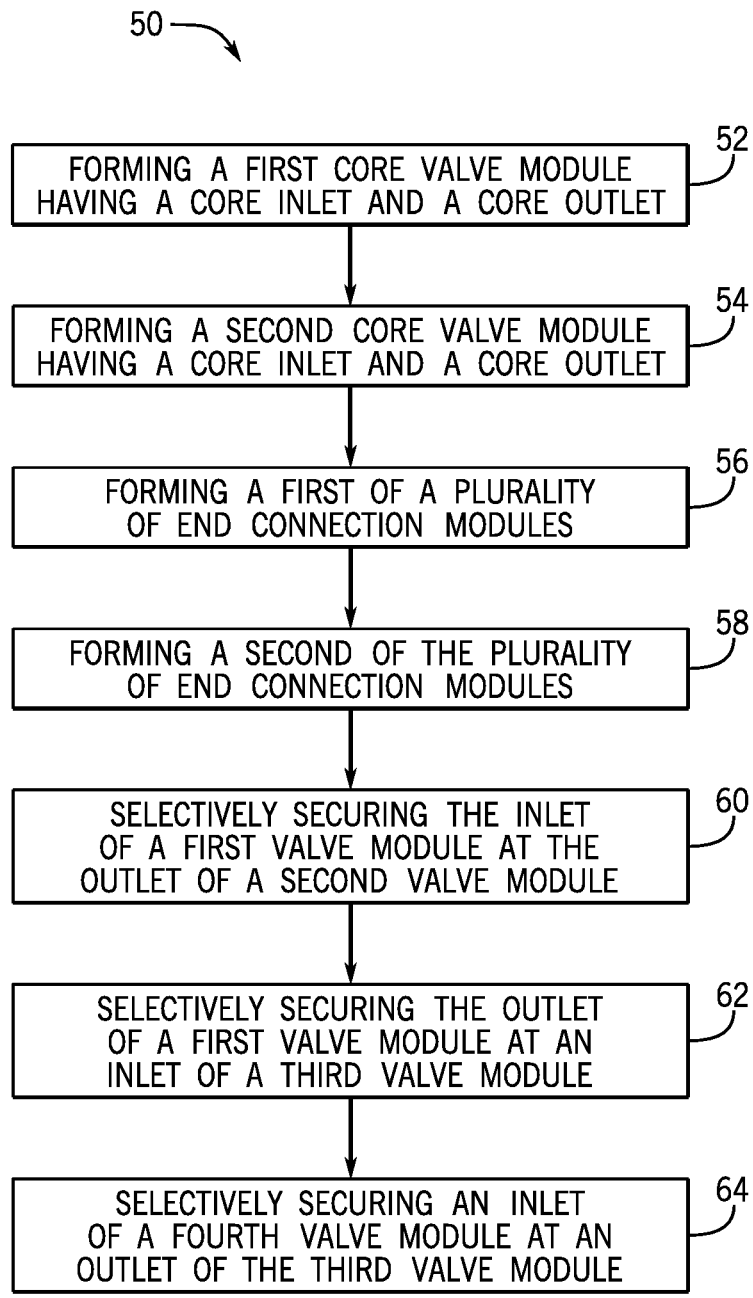
FIG. 3 is a flowchart illustrating a method of configuring the modular valve assembly of FIG. 1 or FIG. 2.

In this regard, for example, FIG. 3 illustrates a method 50 of configuring a modular valve assembly. By way of example, the method 50 will be described below with reference to the modular valve assemblies 10a and 10b (see FIGS. 1 and 2). However, other valve assemblies or modules can be used (or constructed) according to other embodiments of the disclosed method.

In the illustrated example, operation 52 of method 50 includes forming a first core spool module that includes a core inlet and a core outlet (e.g., the core spool module 12a having a core inlet 16a and a core outlet 18a). Operation 54 of method 50 includes forming a second core spool module that includes a core inlet and a core outlet (e.g., the core spool module 12b having a core inlet 16b and a core outlet 18b). Operations 56 and 58 include forming first and second end connection modules (e.g., any or all of the plurality of end connection modules 14a-d). In some cases, the operations 54, 56, 58 can include integrally forming (e.g., casting) each of the core or end connection modules (e.g., the modules 12a, 12b, 14a, 14c, etc.), respectively, as a single-piece component.

With appropriately configured core spool modules and end connection modules having been formed (e.g., as described above), appropriate end and core spool modules can then be selected and combined together to provide a customizable overall configuration of a module valve assembly. In this regard, for example, operation 60 of method 50 includes selectively securing an inlet of a first valve module (e.g., the inlet 16a of the core spool module 12a) at an outlet of another valve module (e.g., the outlet 18b of the core spool modules 12b, or the outlet 22a, 22b, 22c, 22d of any one of the end connection modules 14a, 14b, 14c, 14d). In some cases, the valve modules can be connected via, for example, a clamp ring, as illustrated in FIGS. 4-7, or using other known approaches. In some cases, including those in which three or more valve modules are included in a final valve assembly, operation 62 of method 50 includes also selectively securing an outlet of the first valve module (e.g., the outlet 18a of the core spool module 12a) at an inlet of a third valve module (e.g., the inlet 16b of the core spool module 12b, or the inlet 20a, 20b, 20c, 20d of any one of the end connection modules 14a, 14b, 14c, 14d). As appropriate, operation 64 of method 50 can then also include selectively securing an inlet of a fourth valve module (e.g., the inlet 20a, 20b, 20c, 20d of any one of the end connection modules 14a, 14b, 14c, 14d) at an outlet of the third valve module (e.g., the outlet 18a of the core spool modules 12a).

With continued reference to the flowchart of FIG. 3, one or more of the illustrated operations, including the operations 54, 58, and 60 through 64, can be optional in the method 50. Certain of these operations can be omitted, for example, when configuring the modular valve assembly 10a (see FIG. 1) or other similar assemblies, which may only include a single core spool module. Further, in some implementations, certain operations can be repeated relative to additional inlets or outlets. For example, some implementations can include modification of one or more of the operations 60, 62, 64 to include selectively securing particular valve modules at multiple inlets or outlets a core spool module (e.g., as illustrated in FIG. 2). Similarly, some implementations can include forming one or many pluralities of similar or different valve modules, including multiple different (or similar) core spool modules or end connection modules, as may support a high degree of customizability of final valve assemblies. In this regard, for example, any of the plurality of end connection modules 14a-d can be formed in operations 56 and 58 and secured to one or more of the first core spool module 12a or the second core spool module 12b, as formed in operations 52 and 54, to provide a wide variety of valve configurations.

Referring now to FIGS. 4-7, various example configurations of modular valve assemblies will be described according to embodiments of the invention. In general, the modular valve assemblies described below can be configured according to the method 50 and can collectively and individually provide a variety of different flow configurations. Further, although particular configurations of end connection modules and core spool modules are described, a variety of other types of modules can be similarly configured in some cases.

Figure 4:
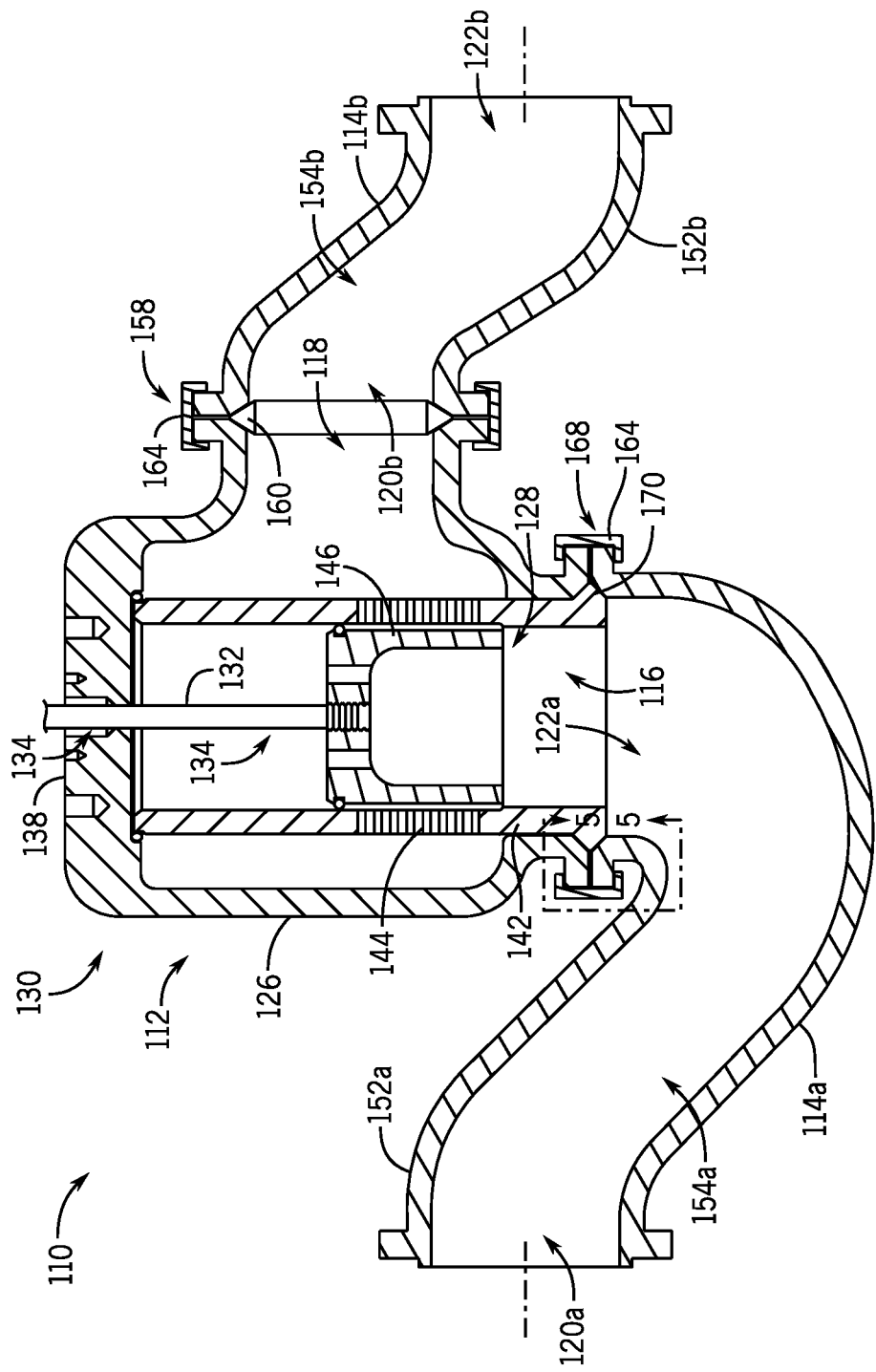
FIG. 4 is a cross-sectional view of an example configuration of a modular valve assembly according to an embodiment of the invention.

FIG. 4 illustrates a modular valve assembly 110 according to an embodiment of the invention. In general, the modular valve assembly 110 can be configured in a variety of flow configurations similar to the modular valve assembly 10a. In the illustrated embodiment, the modular valve assembly 110 includes a core spool module 112 and first and second end connection modules 114a, 114b. Similar to the core spool module 12a, the core spool module 112 includes a core inlet 116 and a core outlet 118. Likewise, each of the end connection modules 114a, 114b includes a respective connection inlet 120a, 120b and a respective connection outlet 122a, 122b.

The core spool module 112 is generally configured as a main valve body and includes an external body portion 126 and an internal flow passage 128. The internal flow passage 128 is configured to receive a process fluid that flows through an interior of the core spool module 112 between the core inlet 116 and the core outlet 118. The core spool module 112 also includes a bonnet portion 130 integrally formed with the core inlet 116 and the core outlet 118. As a result, the bonnet portion 130 is open to the internal flow passage 128 through the core spool module 112. As illustrated, the core spool module 112 supports and encloses a valve stem 132 that extends through a stem opening 134. In some embodiments, the stem opening 134 can be configured as a packing box and can be configured to receive packing (not shown) to help seal the stem opening 134 against venting of the process fluid.

With continued reference to FIG. 4, the core spool module 112 includes an external mounting surface 138. In some embodiments, the external mounting surface 138 can be configured as a yoke boss formed at the bonnet portion 130. In general, the external mounting surface 138 is configured to receive and secure an actuator to move the valve stem 132. Because the bonnet portion 130 is integrally formed (i.e., not separable) from the main valve body (i.e., the core spool module 112), the actuator can be mounted directly to the main valve body, with corresponding benefits for installation procedures and overall durability and performance. In some embodiments, as briefly discussed above, the external mounting surface 138 can also secure or house one or more sensors, data acquisition systems, or transmitters that can be used to monitor or repair components of the modular valve assembly 110. In the illustrated embodiment, the external mounting surface 138 is substantially planar and also generally provides a larger mounting surface area compared to conventional valve bonnets.

Figure 5:
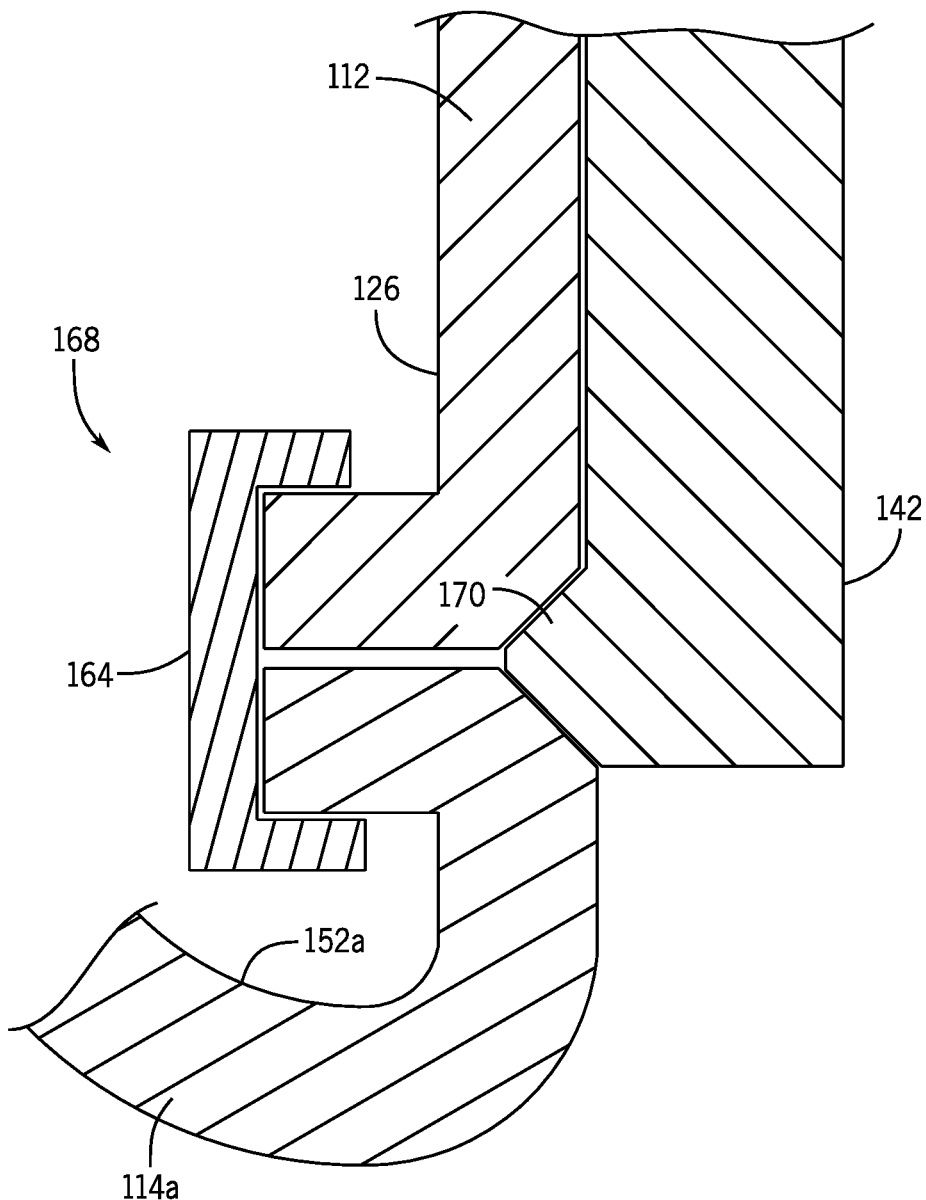
FIG. 5 is a cross-sectional detailed view of a sealing portion of the modular valve assembly of FIG. 4.

As illustrated in FIG. 4, and in greater detail in FIG. 5, the core spool module 112 can also include a seat ring 142. In the illustrated embodiment, the seat ring 142 is configured as a seat insert and can be integrally formed with a flow cage 144, or in general, any other type of plug guide that can be used to guide a plug 146 (see FIG. 4) of the modular valve assembly 110. The plug 146 can be configured to be moved over a range of travel by the actuator to selectively restrict flow through the modular valve assembly 110. Additionally, in the illustrated embodiment, the core inlet 116 is upstream of the valve stem 132 and upstream the range of travel of the valve plug 146. Thus, for example, the plug 146 can be fully enclosed by the core spool module 112 during operation.

Each of the first and second end connection modules 114a, 114b include a respective body portion 152a, 152b and a respective internal flow passage 154a, 154b for flow of the process fluid. In particular, adjacent to each of the respective connection inlets 120a, 120b and the connection outlets 122a, 122b, the respective body portions 152a, 152b form a circular cross section, although other configurations are possible. Additionally, each of the connection inlets 120a, 120b and the connection outlets 122a, 122b are configured to be selectively secured to the core spool module 112 at one or more of the core inlet 116 or the core outlet 118 to provide one or more respective, different flow configurations. In general, the connection inlets 120a, 120b and the connection outlets 122a, 122b can be secured to the core inlet 116 or the core outlet 118 at any of a respective plurality of rotational orientation within a continuous angular range of 0 degrees to 360 degrees, inclusive. Thus, for example, installers can readily configure the inlet 120a and the outlet 122b to match a wide variety of desired installation configurations, without swapping out any of the modules 112, 114a, 114b, or necessarily changing the orientation of the core spool module 112.

FIG. 4 illustrates the modular valve assembly 110 in a first flow configuration. In particular, the connection outlet 122a of the first end connection module 114a is secured to the core inlet 116 and the connection inlet 120b of the second end connection module 114b is secured to the core outlet 118. In use, the modular valve assembly 110 can be secured in the first flow configuration illustrated in FIG. 4 (or other configurations) to form a combined internal flow passage that includes the internal flow passage 128 of the core spool module 112 and the respective internal flow passages 154a, 154b of the end connection modules 114a, 114b. In the configuration illustrated in FIG. 4, the connection inlet 120a of the first end connection module 114a provides a main valve inlet of the modular valve assembly 110 and the connection outlet 122b of the second end connection module 114b provides a main valve outlet of the valve assembly 110.

In the illustrated embodiment, proximate to the core outlet 118 and the second connection inlet 120b is a downstream seam 158. A sealing ring 160 is secured at the downstream seam 158 to provide a seal between the core spool module 112 and the second end connection module 114b. A clamp ring 164 is configured to clamp exterior to the core spool module 112 and the second end connection module 114b to secure the sealing ring 160 interior to the core spool module 112 and the second end connection module 114b to provide a seal between the core spool module 112 and the second end connection module 114b. As briefly described above, due to the circular cross section of the connection inlet 120b and the core outlet 118 and the illustrated clamping configuration, the second end connection module 114b can be rotated and secured to the core spool module 112 at any angular relationship about an axis extending through each of the connection inlet 120b and the core outlet 118.

With continued reference to FIGS. 4 and 5, an upstream seam 168 is proximate to the core inlet 116 and the first connection outlet 122a. A sealing ring 170 is secured at the upstream seam 168 to provide a seal between the core spool module 112 and the first end connection module 114a. Another clamp ring 164 is configured to clamp exterior to the core spool module 112 and the first end connection module 114a to secure the sealing ring 170 interior to the core spool module 112 and the first end connection module 114a to provide a seal between the core spool module 112 and the first end connection module 114a. As briefly described above, due to the circular cross section of the connection outlet 122a and the core inlet 116, the first end connection module 114a can be rotated and secured to the core spool module 112 at any angular relationship about an axis extending through each of the connection outlet 122a and the core inlet 116. However, in other embodiments, non-circular cross sections are possible.

As illustrated in FIGS. 4 and 5, the seat ring 142 can be integrally formed with the sealing ring 170 that is secured at the upstream seam 168 to provide a seal between the core spool module 112 and the first end connection module 114a. In general, the seat ring 142 can be configured as a seat insert and is configured to be secured at the upstream seam 168 to provide one or more of a seal between the first connection outlet 122a and the core inlet 116, or a seat for the plug 146 of the modular valve assembly 110. Further, in the illustrated embodiment, the clamp rings 164 are configured as circular rings; however, other securing devices are possible. For example, some embodiments can include a bolted joint to secure one or more of the end connection modules 114a, 114b to the core spool module 112. Similarly, some embodiments can include sealing members and plug guides that vary from the configurations illustrated in the various FIGS.

Figure 6:
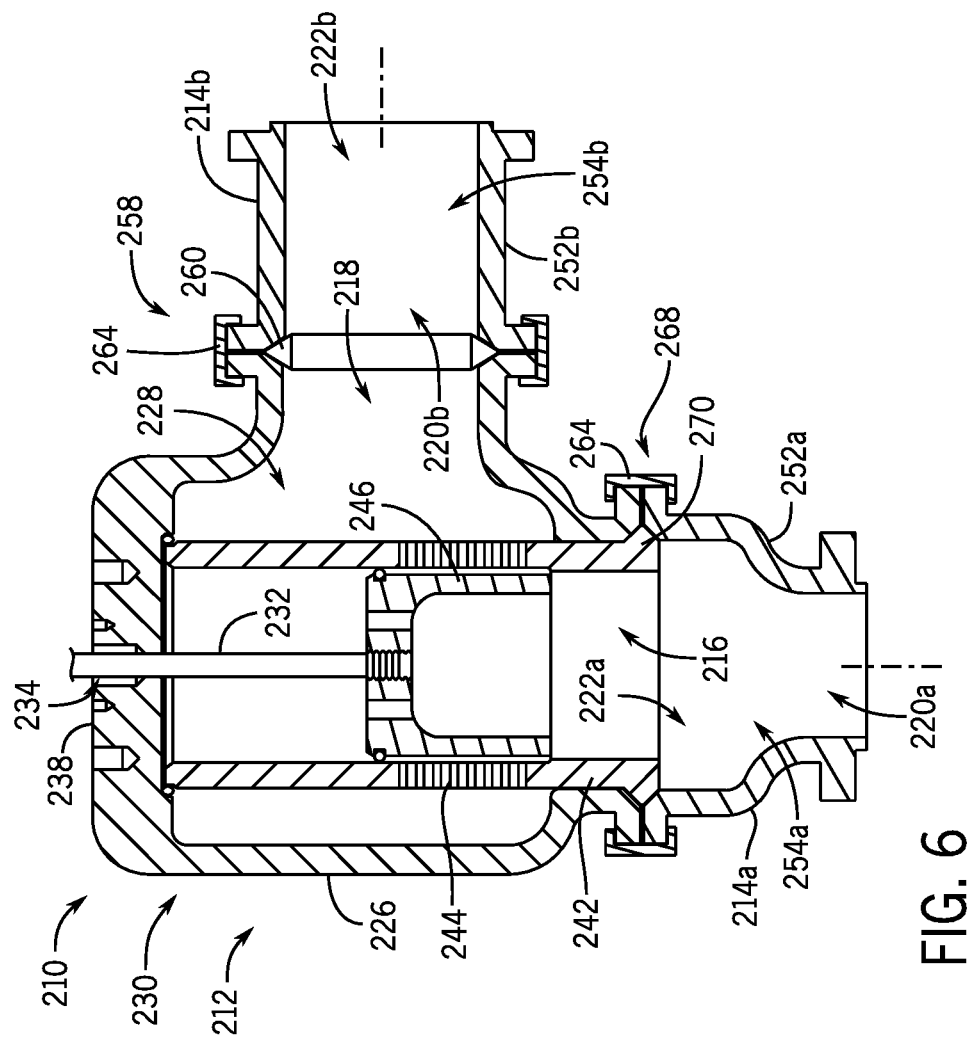
FIG. 6 is a cross-sectional view of another example configuration of a modular valve assembly according to an embodiment of the invention.
Figure 7:
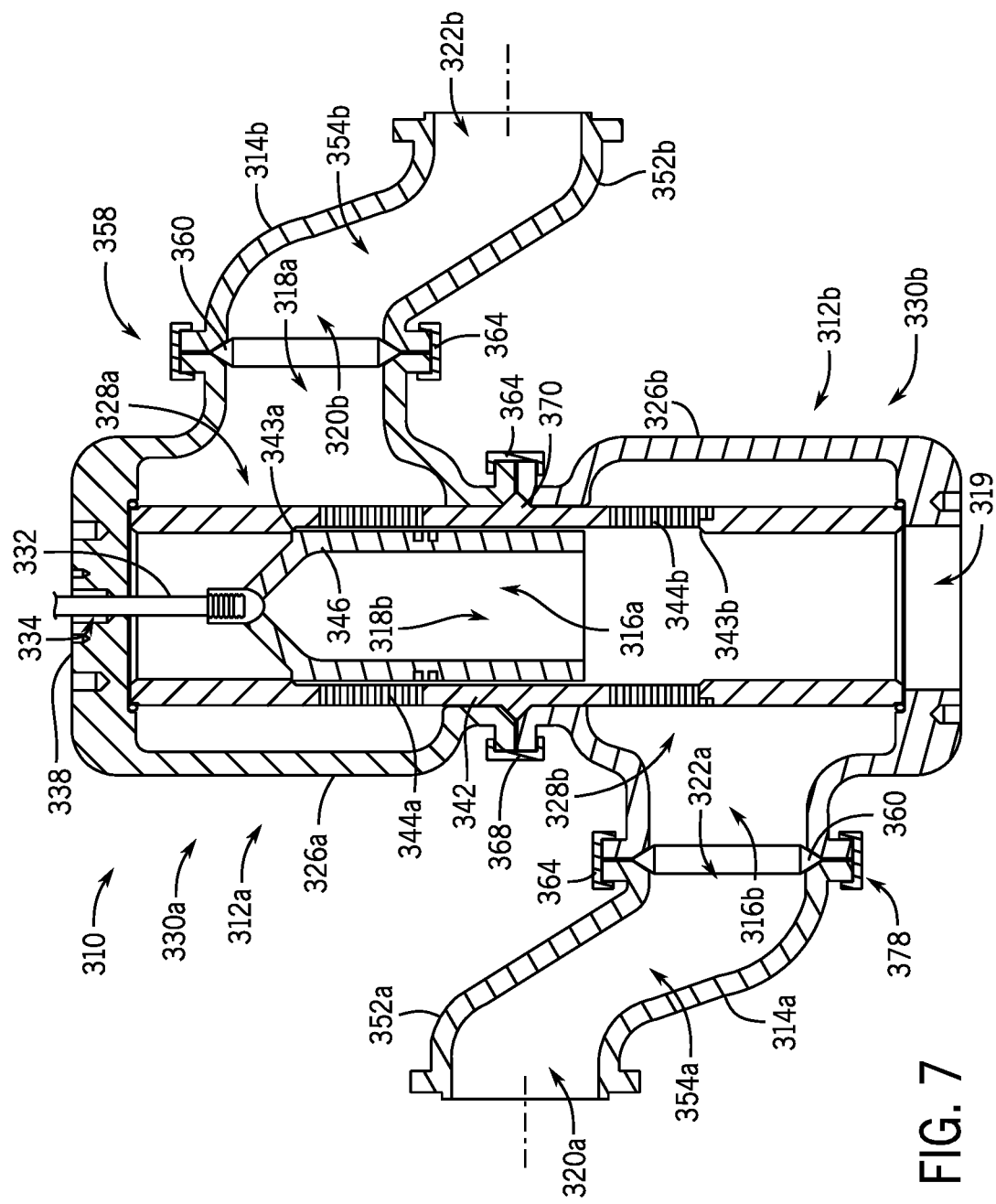
FIG. 7 is a cross-sectional view of yet another example configuration of a modular valve assembly according to an embodiment of the invention.

FIGS. 6 and 7 illustrate modular valve assemblies 210, 310 according to other embodiments of the invention. Like the modular valve assembly 110, each of the modular valve assemblies 210, 310 can be configured in a variety of flow configurations, similar to the modular valve assemblies 10a and 10b, respectively. The modular valve assemblies 210, 310 include similar components to the modular valve assembly 110. Therefore, similar reference numbers referring to the components of the modular valve assemblies 210, 310 will be used to reference similar corresponding components from the modular valve assembly 110 where applicable. Correspondingly, the valve assemblies 210, 310 can be readily configured for a variety of installations, similarly to the valve assembly 110.

With reference to FIG. 6, the modular valve assembly 210 includes a core spool module 212 and first and second end connection modules 214a, 214b. The core spool module 212 includes a core inlet 216 and a core outlet 218. Likewise, each of the end connection modules 214a, 214b includes a respective connection inlet 220a, 220b and a respective connection outlet 222a, 222b. Similar to the core spool module 112, the core spool module 212 includes an external body portion 226 and an internal flow passage 228. The core spool module 212 also includes a bonnet portion 230 integrally formed with the core inlet 216 and the core outlet 218. As illustrated, the core spool module 212 includes a valve stem 232 that extends through a stem opening 234 at the bonnet portion 230.

Further, like the core spool module 112, the core spool module 212 includes an external mounting surface 238. In general, the external mounting surface 238 is configured to receive and secure an actuator to move the valve stem 232. As discussed above, in some embodiments, the external mounting surface 238 can also secure or house one or more sensors, data acquisition systems, or transmitters that can be used to monitor or repair components of the modular valve assembly 210. The core spool module 212 can also include a seat ring 242. The seat ring 242 can be configured as a seat insert and can be integrally formed with a flow cage 244, or in general, a plug guide. A plug 246 of the modular valve assembly 210 can be configured to be moved over a range of travel by the actuator to selectively restrict flow through the modular valve assembly 210. Additionally, each of the first and second end connection modules 214a, 214b include a respective body portion 252a, 252b and a respective internal flow passage 254a, 254b for flow of a process fluid.

FIG. 6 illustrates the modular valve assembly 210 in a first flow configuration. In particular, the connection outlet 222a of the first end connection module 214a is secured to the core inlet 216 and the connection inlet 220b of the second end connection module 214b is secured to the core outlet 218. In use, the modular valve assembly 210 can be secured in the first flow configuration illustrated in FIG. 6 (or other configurations) to form a combined internal flow passage that includes the internal flow passage 228 of the core spool module 212 and the respective internal flow passages 254a, 254b of the end connection modules 214a, 214b. In the configuration illustrated in FIG. 6, the connection inlet 220a of the first end connection module 214a provides a main valve inlet of the modular valve assembly 210 and the connection outlet 222b of the second end connection module 214b provides a main valve outlet of the valve assembly 210.

In the illustrated embodiment, a downstream seam 258 is proximate to the core outlet 218 and the second connection inlet 220b. A sealing ring 260 is secured at the downstream seam 258 and a clamp ring 264 is configured to clamp exterior to the core spool module 212 and the second end connection module 214b to secure the sealing ring 260 interior to the core spool module 212 and the second end connection module 214b. Further, similar to the modular valve assembly 110, an upstream seam 268 is proximate to the core inlet 216 and the first connection outlet 222a. A sealing ring 270 is secured at the upstream seam 268 and another clamp ring 264 is configured to clamp exterior to the core spool module 212 and the first end connection module 214a to secure the sealing ring 270 interior to the core spool module 212 and the first end connection module 214a. In the illustrated embodiment, the sealing ring 270 is integrally formed with the seat ring 242.

In the illustrated embodiment, the core spool module 212 is aligned substantially similarly to the core spool module 112 (see FIG. 4). For example, relative to the illustrated orientation of the core spool module 212 in FIG. 6, the core inlet 216 is oriented toward the bottom of the external body portion 226 and the core outlet 218 is oriented toward the right side of the external body portion 226. In contrast to the core spool module 112, the connection inlet 220a of the first end connection module 214a, and thus, the main valve inlet, is oriented downward relative the core spool module 212 (e.g., as opposed to the connection inlet 120a being leftward relative to the core spool module 112 in the modular valve assembly 110) to provide a different, exemplary flow configuration. However, given that components of the valve assembly 210 can interact, be assembled, and operate substantially similarly to the components with the same name and similar reference number of the valve assembly 110, a further detailed description of such interaction and operation can be drawn from previous description. Generally, in this regard, it can be seen that a particular core spool module (or modules) can be selectively combined with one or more particular end connection modules to customizably provide a wide range of potential configurations for a modular valve assembly as a whole.

With reference to FIG. 7, the modular valve assembly 310 is configured as a three-way valve and includes first and second core spool modules 312a, 312b and first and second end connection modules 314a, 314b. The first core spool module 312a includes a core inlet 316a and a core outlet 318a. The second core spool module 312b includes a core inlet 316b, a core outlet 318b and a secondary outlet 319 (or secondary inlet 319 depending on the configuration of the modular valve assembly 310). Each of the end connection modules 314a, 314b includes a respective connection inlet 320a, 320b and a respective connection outlet 322a, 322b. Similar to the core spool module 112, the core spool modules 312a, 312b each include a respective external body portion 326a, 326b and a respective internal flow passage 328a, 328b. The core spool modules 312a, 312b each include a bonnet portion 330a, 330b integrally formed with the respective core inlet 316a, 316b and the core outlet 318a, 318b. As illustrated, the first core spool module 312a includes a valve stem 332 that extends through a stem opening 334 at the bonnet portion 330a.

Further, like the core spool modules 112, 212, the first core spool module 312a includes an external mounting surface 338 that is configured to receive an actuator to move the valve stem 332. The core spool modules 312a, 312b also include a seat ring 342, with two seats 343a, 343b to allow for three-way valve operation. The seat ring 342 can be configured as a seat insert and can be integrally formed with a flow cage 344a, 344b, or in general, a plug guide. A plug 346 of the modular valve assembly 310 can be configured to be moved over a range of travel by the actuator to selectively restrict flow through the module valve assembly 310. Additionally, each of the first and second end connection modules 314a, 314b include a respective body portion 352a, 352b and a respective internal flow passage 354a, 354b for flow of a process fluid.

FIG. 7 illustrates the modular valve assembly 310 in a first flow configuration. In particular, the connection outlet 322a of the first end connection module 314a is secured to the second core inlet 216b and the connection inlet 320b of the second end connection module 314b is secured to the first core outlet 318a. In use, the modular valve assembly 310 can be secured in the first flow configuration illustrated in FIG. 7 (or other configurations) to form a combined internal flow passage that includes the internal flow passages 328a, 328b of the core spool modules 312a, 312b and the respective internal flow passages 354a, 354b of the end connection modules 314a, 314b. In the configuration illustrated in FIG. 7, the connection inlet 320a of the first end connection module 314a can provide a main valve inlet of the modular valve assembly 310, the connection outlet 322b of the second end connection module 214b can provide a second main valve inlet of the valve assembly 310, and the secondary outlet 319 can provide a main valve outlet of the valve assembly 310.

In the illustrated embodiment, proximate to the first core outlet 218a and the second connection inlet 320b is a downstream seam 358. A sealing ring 360 is secured at the downstream seam 358 and a clamp ring 364 is configured to clamp exterior to the first core spool module 312a and the second end connection module 314b to secure the sealing ring 360 interior to the first core spool module 312a and the second end connection module 314b. Further, proximate to the second core inlet 316b and the first connection outlet 322a is an upstream seam 378. Another sealing ring 360 is secured at the upstream seam 378 and another clamp ring 364 is configured to clamp exterior to the second core spool module 312b and the first end connection module 314a to secure the sealing ring 360 interior the second core spool module 312b and the first end connection module 314a.

With continued reference to FIG. 7, the modular valve assembly 310 further includes a core seam 368 formed between each of the first core spool module 312a and the second core spool module 312b. In particular, the core seam 368 is proximate to the core inlet 316a of the first core spool module 312a and the core outlet 318b of the second core spool module 312b. A sealing ring 370 is secured at the core seam 368 and another clamp ring 364 is configured to clamp exterior to each of the first and second core spool modules 312a, 312b to secure the sealing ring 370 interior to the core spool modules 312a, 312b. The seat ring 342 can be integrally formed with the sealing ring 370 and is configured to be secured upstream the core inlet 316b of the second core spool module 314b.

While the modular valve assembly 310 includes the first and second end connection modules 314a, 314b to form a first flow configuration, in other embodiments, other flow configurations are possible. For example, any of the end connection modules 114a, 114b, 214a, 214b (or others) can be selectively secured to one or more of the core spool modules 312a, 312b at one or more of the core inlets 316a, 316b or the core outlets 318a, 318b to provide one or more respective, different flow configurations for a modular valve assembly. In general, given that components of the valve assembly 310 interact, assemble, and operate substantially similar to the components with the same name and similar reference number of the valve assembly 110, a further detailed description of such interaction and operation can be drawn from previous description.

Thus, embodiments of the disclosed invention can provide a modular valve assembly and a method of configuring a modular valve assembly. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A modular valve assembly comprising:
a first core spool module that defines a first core external body portion and a first core internal flow passage for flow of process fluid through an interior of the first core spool module, the first core spool module including a first bonnet portion, and a first core inlet and a first core outlet that are integrally formed with the first bonnet portion, and the first core internal flow passage extending from the first core inlet to the first core outlet;
a second core spool module that defines a second core external body portion and a second core internal flow passage for flow of the process fluid though an interior of the second core spool module, the second core spool module including a second bonnet portion, and a second core inlet and a second core outlet that are integrally formed with the second bonnet portion, and the second core internal flow passage extending from the second core inlet to the second core outlet;
a first end connection module having a first connection inlet and a first connection outlet and defining a first external body portion and a first internal flow passage for flow of the process fluid; and
a second end connection module having a second connection inlet and a second connection outlet and defining a second external body portion and a second internal flow passage for flow of the process fluid;
the first and second end connection modules being configured to be secured to the first and second core spool modules, to provide a combined internal flow passage for the process fluid that includes the first and second internal core flow passages and the first and second internal flow passages in a three-way valve configuration, with:
the second core spool module arranged between the first connection module and the first core spool module, such that the first connection outlet is secured at the second core inlet, the second core outlet is secured at the first core inlet, and the second connection inlet is secured at the first core outlet;
the first connection outlet and second core inlet forming a first seam along the combined internal flow passage;
a first sealing ring arranged within the combined internal flow passage at the first seam;
the second connection inlet and the first core outlet forming a second seam along the combined internal flow passage;
a second sealing ring arranged within the combined internal flow passage at the second seam;
the first connection inlet providing a main valve inlet for the modular valve assembly; and
the second connection outlet providing a main valve outlet for the modular valve assembly.

2. The modular valve assembly of claim 1, wherein the first connection outlet is configured to be selectively secured to the second core inlet at any of a plurality of first rotational orientations within a first continuous angular range and the second connection inlet is configured to be selectively secured to the first core outlet at any of a plurality of second rotational orientations within a second continuous angular range, to provide a plurality of corresponding flow configurations for the modular valve assembly.

3. The modular valve assembly of claim 1, wherein the first bonnet portion is open to the first core internal flow passage.

4. The modular valve assembly of claim 3, wherein the first core spool module further includes a stem opening for passage of a valve stem into the interior of the first core spool module, and a planar external mounting surface configured to secure an actuator for the valve stem.

5. The modular valve assembly of claim 1, further comprising:
a ring insert configured to be secured at seam between the second core outlet and the first core inlet to provide one or more of: a sealing ring; or a seat for a plug of the modular valve assembly.

6. The modular valve assembly of claim 5, wherein the ring insert is integrally formed as the first sealing ring and includes a sealing portion to provide a seal between the second core outlet and the first core inlet, and a seat portion to provide the seat for a plug of the modular valve assembly.

7. The modular valve assembly of claim 1, further comprising:
a third end connection module having a third connection inlet and a third connection outlet and defining a third external body portion and a third internal flow passage for flow of the process fluid; and
a fourth end connection module having a fourth connection inlet and a fourth connection outlet and defining a fourth external body portion and a fourth internal flow passage for flow of the process fluid;

wherein the third and fourth end connection modules are configured to be selectively secured to the first and second core spool modules at the first and second core inlets and the first and second core outlets, to provide a different flow configuration for the modular valve assembly than when the first and second end connection modules are secured to the first and second core spool modules.

* * * * *